US006682088B1

United States Patent
Lin

(12) United States Patent
(10) Patent No.: US 6,682,088 B1
(45) Date of Patent: Jan. 27, 2004

(54) BICYCLE HEAD TUBE AND BALL BEARING MOUNTING ARRANGEMENT

(76) Inventor: Wen-Hwa Lin, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 10/192,792

(22) Filed: Jul. 11, 2002

(51) Int. Cl.[7] ............................................. B62K 21/06
(52) U.S. Cl. ..................... 280/280; 280/279; 384/545; 384/536
(58) Field of Search ................. 280/279, 280; 74/551.1; 384/545, 536; 403/365–368; 277/500

(56) References Cited

U.S. PATENT DOCUMENTS 5,680,798 A * 10/1997 Luen .......................... 280/279
5,823,556 A * 10/1998 Chi ............................ 280/279
5,971,415 A * 10/1999 Lin ............................ 280/280
6,254,115 B1 * 7/2001 Lin ............................ 280/279

* cited by examiner

Primary Examiner—Lesley D. Morris
Assistant Examiner—Matthew Luby

(57) ABSTRACT

A bicycle head tube and ball bearing mounting arrangement in which two gasket rings are respectively mounted in expanded top and bottom receiving portions of a head tube to support a respective ball bearing assembly in each end of the head tube, which ball bearing assembly supports a handlebar stem and front fork assembly in the head tube, the gasket rings each having a curved inner diameter fitted over the bottom edge of the respective ball bearing assembly to prevent direct contact of the bottom edge of the respective ball bearing assembly from direct contact with the respective expanded receiving portion of the head tube.

3 Claims, 3 Drawing Sheets

BICYCLE HEAD TUBE AND BALL BEARING MOUNTING ARRANGEMENT

BACKGROUND OF THE INVENTION

The present invention relates to a head tube and ball bearing mounting arrangement for bicycle and, more particularly to such a bicycle head tube and ball bearing mounting arrangement, which is durable in use and, produces less noise during movement of the bicycle.

In a bicycle, ball bearing assemblies are used and installed in top and bottom ends of the head tube to support the handlebar stem and front fork assembly, enabling the handlebar stem and front fork assembly to be rotated relative to the head tube. FIGS. from 1 through 4 show different designs of bicycle head tube and ball bearing mounting arrangement according to the prior art. According to these designs, the ball bearing assembly is directly supported on the top or bottom end of the head tube. When riding the bicycle over an uneven road surface, the ball bearing assembly is moved up and down and vertically intermittently forced against the head tube, thereby causing severe friction between the ball bearing assembly and the head tube with accompanied high noise. Due to this reason, the ball bearing assembly wears quickly with use.

SUMMARY OF THE INVENTION

The present invention has been accomplished to provide a bicycle head tube and ball bearing mounting arrangement, which eliminates the aforesaid drawbacks. It is therefore the main object of the present invention to provide a bicycle head tube and ball bearing mounting arrangement, which is durable in use. It is another object of the present invention to provide a bicycle head tube and ball bearing mounting arrangement, which produces less noise during running of the bicycle. According to the present invention, two gasket rings are mounted in the head tube to support the respective ball bearing assemblies in the expanded receiving portions at the ends of the head tube. The gasket rings each have a tapered inner diameter that fits over the tapered bottom edge of the respective ball bearing assembly to prevent direct contact between the head tube and the bottom edge of the respective ball bearing assembly, and to minimize friction resistance between each ball bearing assembly and the head tube during movement of the bicycle.

DETAILED DESCRIPTION OF THE PREFERRED EMBODIMENT

Referring to FIGS. and 6, a bicycle head tube and ball bearing mounting arrangement in accordance with the present invention is shown comprised of an upright head tube 10, the head tube 10 has two expanded receiving portions 11 respectively disposed in the top and bottom ends thereof, and two ball bearing assemblies 20 respectively mounted in the expanded receiving portions 11 of the head tube 10 in reversed directions and adapted to support a handlebar stem and front fork assembly (not shown) in the head tube 10, for enabling the handlebar stem and front fork assembly to be rotated relative to the head tube 10.

Figure 1:
FIG. 1 is a sectional view showing a bicycle head tube and ball bearing mounting arrangement according to the prior art.
Figure 2:
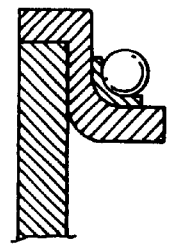
FIG. 2 is a sectional view showing another design of bicycle head tube and ball bearing mounting arrangement according to the prior art.
Figure 3:
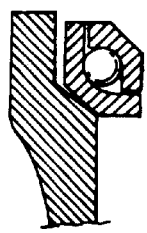
FIG. 3 is a sectional view showing still another design of bicycle head tube and ball bearing mounting arrangement according to the prior art.
Figure 4:
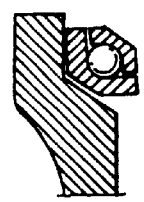
FIG. 4 is a sectional view showing still another design of bicycle head tube and ball bearing mounting arrangement according to the prior art.
Figure 5:
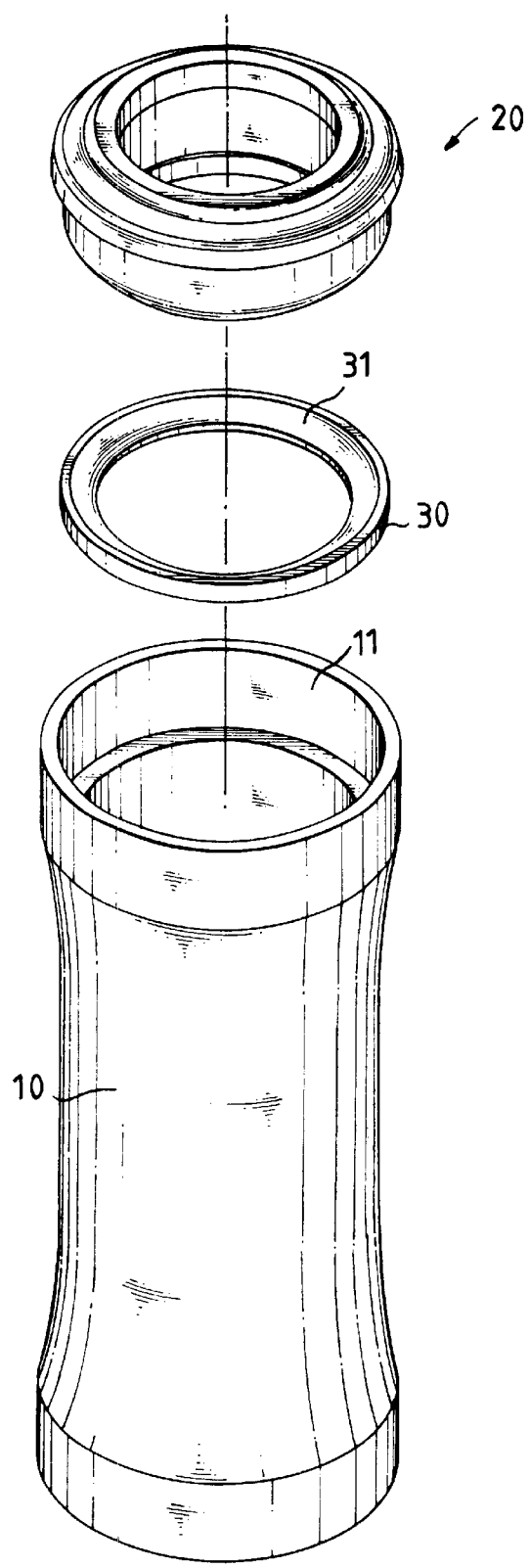
FIG. 5 is an exploded view of the present invention.
Figure 6:
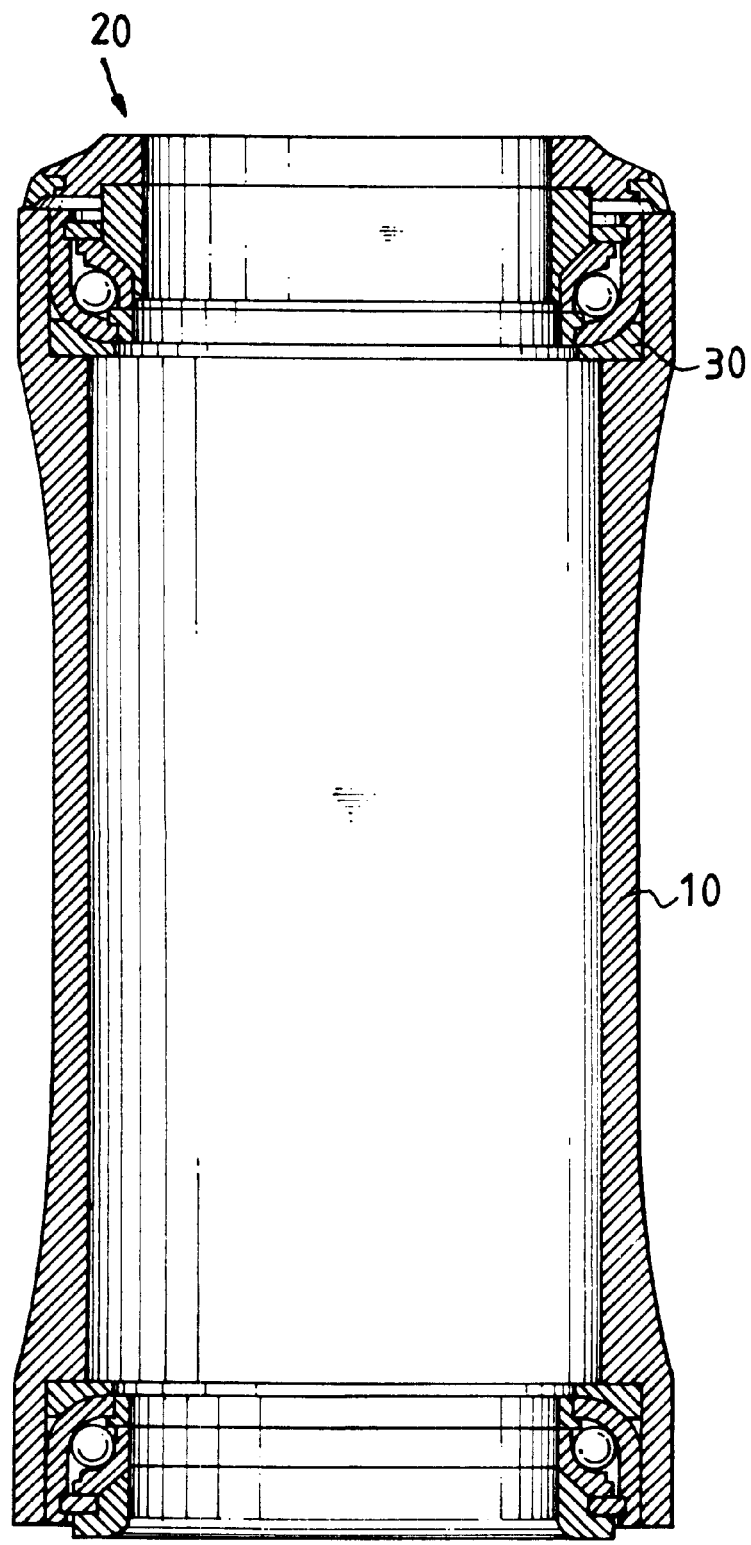
FIG. 6 is a sectional assembly view of the present invention.

The main feature of the present invention is outlined hereinafter with reference to FIGS. 5 and 6 again. Two gasket rings 30 are respectively mounted in the top and bottom ends of the head tube 10 to support the respective ball bearing assemblies 20 in the respective expanded receiving portions 11. Each gasket ring 30 has a tapered inner diameter 31 fitting over the tapered bottom edge of the respective ball bearing assembly 20. When installed, the tapered bottom edge of the ball bearing assembly 20 is supported on the tapered inner diameter 31 of the corresponding gasket ring 30, and the periphery of the ball bearing assembly 20 is disposed in contact with the peripheral wall of the corresponding expanded receiving portion 11 of the head tube 10. This arrangement prevents direct contact between the bottom edge of each ball bearing assembly 20 with the corresponding receiving portion 11 of the head tube 10. Therefore, the vertical vibration of the assembly of the handlebar stem of the handlebar and the front fork with the front wheel (not shown) does not cause direct impact between the ball bearing assemblies 20 and the expanded receiving portions 11 of the head tube 10 when the bicycle moved over an uneven road surface, and at the same time the gasket rings 30 absorb the shocks.

In structural design, the gasket rings 30 can be split rings convenient for mounting and dismounting. The inner diameter 31 of each gasket ring 30 may be made smoothly arched subject to the curvature of the bottom edge of each of the ball bearing assemblies 20.

While only one embodiment of the present invention has been shown and described, it will be understood that various modifications and changes could be made thereunto without departing from the spirit and scope of the invention disclosed.

What the invention claimed is:

1. A bicycle head tube and ball bearing mounting arrangement comprising a head tube, said head tube having two expanded receiving portions respectively disposed in top and bottom ends thereof, and two ball bearing assemblies respectively mounted in said expanded receiving portions of said head tube in reversed directions and adapted to support a handlebar stem and front fork assembly in said head tube, for enabling said handlebar stem and front fork assembly to be rotated relative to said head tube; wherein two gasket rings are respectively mounted in the top and bottom ends of said head tube to support said ball bearing assemblies in said expanded receiving portions of said head tube, said gasket rings each having a curved inner diameter fitted over the bottom edge of the respective ball bearing assembly to prevent direct contact of the bottom edge of the respective ball bearing assembly from direct contact with the respective expanded receiving portion of said head tube.

2. The bicycle head tube and ball bearing mounting arrangement as claimed in claim 1 wherein said gasket rings are split rings.

3. The bicycle head tube and ball bearing mounting arrangement as claimed in claim 1 wherein the inner diameter of each of said gasket rings is tapered.

* * * * *